SELF-ADAPTIVE ECHO CANCELLER

Filed Oct. 31, 1966 2 Sheets-Sheet 1

INVENTORS
J. L. KELLY, JR., DECEASED
MYLDRED P. KELLY
HIS EXECUTRIX
B. F. LOGAN, JR.
BY G. E. Hirsch
ATTORNEY March 10, 1970 J. L. KELLY, JR., ET AL 3,500,000

SELF-ADAPTIVE ECHO CANCELLER

Filed Oct. 31, 1966 2 Sheets-Sheet 2

United States Patent Office 3,500,000
Patented Mar. 10, 1970

3,500,000
SELF-ADAPTIVE ECHO CANCELLER

John L. Kelly, Jr., deceased, late of Berkeley Heights, N.J., by Myldred P. Kelly, executrix, Berkeley Heights, and Benjamin F. Logan, Jr., Madison, N.J., assignors to Bell Telephone Laboratories, Incorporated, Murray Hill, N.J., a corporation of New York Filed Oct. 31, 1966, Ser. No. 591,382
Int. Cl. H04b 3/20; H04m 9/08
U.S. Cl. 179—170.2 19 Claims

ABSTRACT OF THE DISCLOSURE

Conventional echo suppressors generally combat echoes generated at hybrid junctions in long distance telephone connections by interrupting the return path according to some decision scheme based upon the relative levels of the outgoing and return signals. In contrast, the self-adaptive echo canceller described herein cancels the echo without interrupting the return path. A replica of the echo is synthesized and subtracted from the return signal. The replica is synthesized by means of a filter which, under control of a feedback loop, adapts to the transmission characteristic of the echo path and tracks variations of the path that may occur during a conversation.

Figure 1:
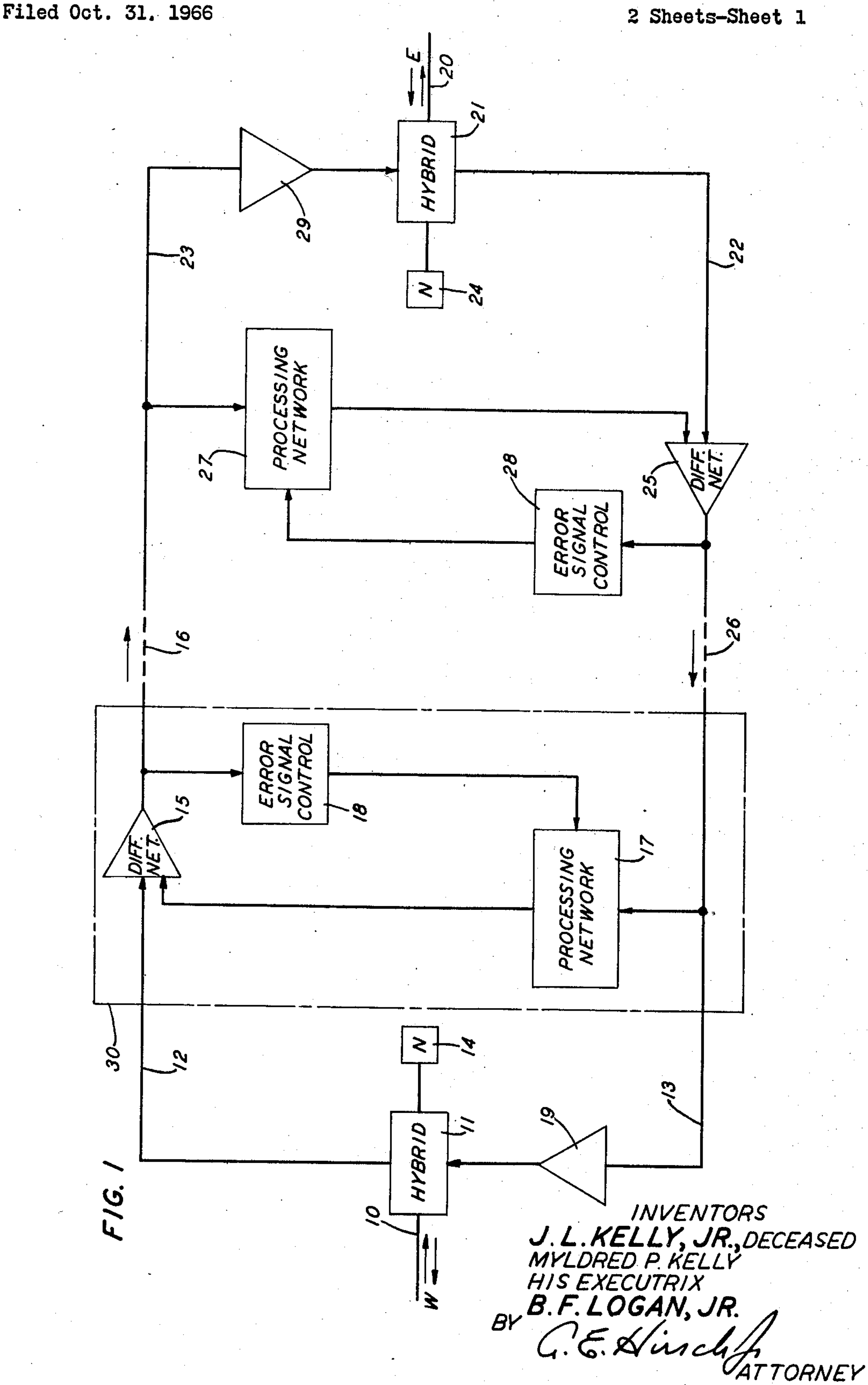

This invention relates to the suppression of echoes in communication channels and more particularly to the effective suppressing of echoes in a two-way telephone circuit of extremely long length such as, for example, a circuit completed by way of a satellite repeater in orbit about the earth. Its principal object is to afford improved protection against echoes irrespective of the length of the transmission circuits in use.

Echoes occur in telephone circuits when electrical signals meet imperfectly matched impedance junctions and are partially reflected back to the talker. Because such signals require a finite travel time, this reflected energy or echo, is heard some time after the speech is transmitted. As distances increase, the echo takes longer to reach the talker and becomes more and more annoying. An attempt is therefore generally made to control these reflections with voice-operated devices, known as echo suppressors, which function to attenuate or disable the voice path in one direction when a signal is detected on the path going in the other direction.

For circuits with moderate delays, such as transcontinental communication channels, the delay is of the order of several tens of milliseconds. This is sufficient to produce noticeable separation in the form of audible echoes which adversely affect the efficiency of verbal communication. Fortunately, suppressors have been developed which adequately cope with such echoes. For satellite communication circuits, on the other hand, the delay may be of the order of several hundred milliseconds, depending upon the height of the satellite, the number of satellites involved, and so on.

In a conversation carried on on a circuit with this order of delay, it has been found that there is a tendency for one talker to anticipate another talker's response and break in on the conversation without his realizing that he is doing so. Typically, he breaks in to repeat the previously transmitted utterance or to question its receipt by the other party, and the does so during the time that the delayed answer is being transmitted. An echo introduced in the transmission loop compounds talker confusion, often to the point of a complete breakdown of conversation.

The adverse effects of eoches are thus greatly magnified with satellite circuits. Ordinary echo suppression devices are inadequate to cope with extensively delayed echoes. It is therefore preferable to eliminate echoes, for example, by complete cancellation, while at the same time permitting transmission in both directions. An echo-free circuit with suitable facility for double talking appreciably shortens talker delay between question and response, or comment and reaction, and thus gives both talkers a sense of conversational presence.

It is a specific object of this invention to improve the quality of speech or other communications signals transmitted over long distances by substantially eliminating echo returns without, however, impeding the free flow of conversation in both directions.

The objects of the invention are attained by continuously examining signals in the paths leading to and from a four-wire to two-wire telephone circuit junction, and by taking appropriate action to minimize signal correlation in the two one-way paths of the four-wire circuit. By eliminating correlated signals in the two one-way paths, incoming and outgoing signals are allowed to flow freely but incoming signal components which accompany outgoing signals, as echoes, e.g., incoming signals passed through an imperfectly terminated junction, are effectivey cancelled.

Stated in another way, the objects of the invention are attained by utilizing adjustable signal processing apparatus in the first of two one-way transmission paths of a communication system, together with an algebraic combining network connected in the second of the two one-way paths. Signals produced by the algebraic network are used for continuously adjusting the signal processing means connected in the first path, thus to minimize the presence of correlated signals in the output path.

In one embodiment of the invention, a signal-cancelling echo suppressor employs a self-adjusting transversal filter supplied with signals incoming to a four-wire to two-wire junction. Error signals, derived by processing signals in the outgoing path, continuously control the adjustment of the transversal filter so that the filter produces a replica of an undesired echo at its output. The replica signal is thereupon substracted from the outgoing signals and the differential is used as a new error signal for controlling the transversal filter.

Experience has shown that with such a system, convergence toward a status of low correlation is relatively rapid so that suppression may be substantial without, however, actually breaking either the incoming or the outgoing paths. Double talking may continue but both talkers are relieved of the confusion normal to a circuit contaminated by echo.

Figure 2:
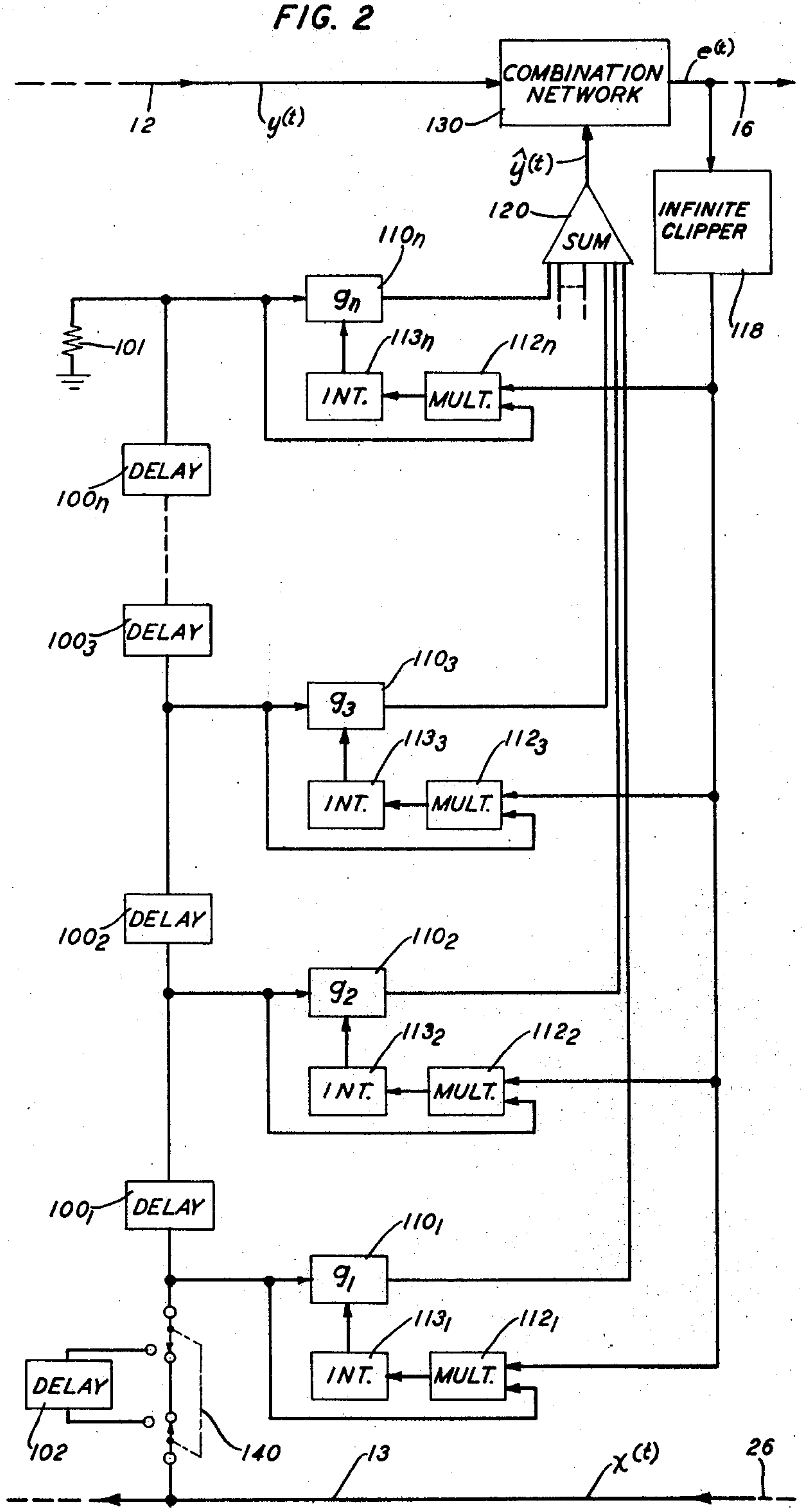

The invention will be fully apprehended from the following detail description of an illustrative embodiment thereof taken in connection with the appended drawings in which:

FIG. 1 is a block schematic diagram showing a two-way signal transmission system which utilizes signal processing apparatus in accordance with the present invention; and FIG. 2 is a block schematic diagram showing the structural details of a portion of the system of FIG. 1.

FIG. 1 illustrates by way of a greatly simplified diagram, a signal transmission system interconnecting two terminal stations designated respectively E (east) and W (west). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well-known fashion, the hybrid network provides a one-way path for voice currents from circuit 10 to outgoing circuit 12 and another one-way path for incoming currents from circuit 13 to local circuit 10. The impedance of the local circuit 10 is matched insofar as practical by a balancing network 14 associated with hybrid 11.

Outgoing currents in circuit 12 are passed by way of difference network 15 to the west-to-east transmission circuit 16. Circuit 16 typically includes both traditional telephone links, and circuit completed by way of one or more earth satellites. At the east station, currents from circuit 16 are delivered by way of isolating amplifier 29 to hybrid network 21. Hybrid 21, which is terminated by network 24, transfers incoming currents from circuit 23 to subscriber circuit 20 and routes locally generated currents from circuit 20 to outgoing circuit 22. Output currents are passed by way of difference network 25 to east-to-west transmission circuit 26, also generally including a satellite transmission link, to station W. Signal currents received at station W are delivered by way of circuit 13, which may include isolating amplifier 19, to hybrid 11.

Ideally, all incoming currents are passed to the subscriber line; none is transferred to the outgoing circuit. Unfortunately, the balancing networks generally provide only a partial match to the two-wire circuits (10 and 20), and a portion of the incoming signal reaches the outgoing circuit. In the absence of adequate suppression, this portion is returned to the remote station and is perceived as an echo. Accordingly, echo-suppressing apparatus is employed to eliminate the return signal without, however, interrupting either the incoming or the outgoing circuits. In accordance with the invention, echos are removed by developing a signal which constitutes as nearly as possible a replica of that portion of the incoming circuit which, due to hybrid inadequacies, reaches the outgoing circuit.

Considering the apparatus associated with station W (identical apparatus may be employed at station E), processing network 17 is supplied with signals incoming on circuit 13. It develops the requisite replica of the incoming signal to cancel that portion of the signal in circuit 12 which corresponds to a signal in circiut 13, i.e., an echo. The cho is thereupon cancelled by subtracting the replica signal from the contaminated signal in circuit 12 through the action of algebraic difference network 15.

Since the character of the "echo" signal continuously changes, it is necessary to adjust processing network 17 continuously in accordance with the change. This is done in accordance with the invention by examining the signal produced at the output of difference network 15 and determining the degree of echo present, and adjusting processing network 17 to achieve full cancellation of the echo present in circuit 12. Continuous adjustment assures rapid convergence of the match between echo and the processed cancellation signal. It has been found that excellent convergence can be achieved, for example in approximately 0.2 to 0.5 second, and that suppression on the order of 30 db is possible.

FIG. 2 illustrates apparatus suitable for processing incoming signals to derive the requisite replica signal and means for performing the desired cancellation. The apparatus of FIG. 2 corresponds generally to that included within dashed enclosure 30 in FIG. 1.

Signals incoming in circuit 13 are delivered to a transversal filter which includes delay elements $100_1$–$100_n$. Transversal filter 100 may be suitably terminated by resistor 101 or the like. If desired, an additional fixed delay 102 may be inserted ahead of the transversal filter, for example by way of switch 103, to compensate for gross delays due to extremely long circuit. Each delay element of the filter, in a typical example in practice, imparts a one-tenth millisecond delay ($\tau$) to an applied signal. Thus, exact replicas of the signal in circuit 23 are repeatedly available at one millisecond intervals.

Individual signals produced at the taps of the transversal filter are adjusted in gain by means of networks $110_1$ through $110_n$ through which they are directed, and are combined in summing network 120. The resultant composite signal is supplied to combining network 130 together with signals outgoing via circuit 12. Combining network 130 effectively supplies the algebraic difference and delivers an echo-free signal to outgoing circuit 16.

For a static situation—i.e., one in which a steady state signal is incoming on channel 13, ordinary techniques for adjusting the relative gains of control networks 110, the polarity of the signals issuing from gain control networks 110, and the number of taps employed in delay network 100 suffice to achieve a composite signal at the output of summing network 120 sufficient to approximate a selected portion of the signal appearing in circuit 12. However, the situation is not a static one. The signals incoming on circuit 13 are speech signals characterized by erratic signal levels interspersed with silent intervals. Similarly, the signals in outgoing circuit 12 comprise a combination of locally generated signals, which vary considerably in magnitude and which are characterized by frequent silent intervals, together with delayed and attenuated replicas of the signal incoming on circuit 13, i.e., echo components. Accordingly, the characteristics of the transversal network must be continuously adjusted to assure that the signal developed by summing amplifier 120 closely approximates only the echo component appearing in outgoing circuit 12.

In accordance with the invention, a closed error loop technique is employed. Thus, an initial replica signal produced by summing network 120 is subtracted via combination network 130 from the composite output signal in circuit 12. The resultant signal delivered to transmission network 16 thus represents the locally generated output signal plus any residue echo—i.e., that portion of the echo signal not removed through the subtraction process. This composite signal constitutes an error component which is processed by error signal control 118 and delivered in parallel to multiplier networks $112_1$–$112_n$. However, the error signal is not by itself suitable for indicating the necessary adjustment of the respective gain control networks 110 to obtain full correction. Accordingly, the incoming signal which appears in variously delayed versions at the junctions of delay elements 110 are mixed—e.g., by multiplication with the error component, and the resultant signal is averaged—e.g., in integrating networks 113, to produce a signal whose polarity and magnitude indicate the appropriate correction for each gain control network. Thus, if the error signal indicates a substantial remanent of the echo in the outgoing transmission network, the gain control networks 110 are individually adjusted to pass a greater portion of the signal incoming in signal 13. Hence, the composite signal developed by network 120 and removed from the outgoing signal in network 130 tends to remove the disparity and reduce the magnitude of the error signal.

Following the adjustment outlined above, it may well be that an overshoot has occurred—i.e., the replica signal substracted from the outgoing signal was too great. This is immediately sensed by the error signal control network 118 and the gain control networks 110 are readjusted to close the gap. It has been found in practice that convergence toward essentially full echo removal can be achieved in an extremely short time by thus adjusting the gain coefficients for each tap signal of the transversal filter in accordance with the integral of the product of the error signal and the signal appearing at the several taps of the transversal filter delay.

That this is so may be determined from a mathematical appraisal of the adaptive control loop of the invention. Let $g_i(t)$ be the gain coefficient established by networks 110 for the N tap signals of delay network 100. Let $x(t)$ represent the signal incoming via circuit 13, and let $y(t)$ represent the signal outgoing in circuit 12. The outgoing signal $y(t)$ includes a portion of the $x(t)$ signal, which we classify as echo, and may include a signal which originates at the local station—e.g., at station W in the apparatus of FIG. 1. The composite output of the transversal filter, available at the output of summing network 120, is represented by $$\hat{y}(t)$$

In the absence of a locally originated signal, the signal developed at the output of combination network 130 may be represented as the error signal $$e(t)=y(t)-\hat{y}(t)$$

An equilibrium, echo free, condition ($g_i(t)=0$, $i=1 \ldots N$) obtains if, and only if, $e(t)=0$. The system converges monotonically to this equilibrium condition if an input signal $s(t)$ passed through the adjusted N-tap transversal filter constitutes an exact replacement for the echo component.

If $y(t)$ consists of such an echo plus noise (which map include a speech signal) that is statistically independent of the echo, then the system will still converge to this equilibrium, although more slowly. If an exact replica of the echo component is not developed as $s(t)$ passes through an N-tap transversal filter, then an uncancellable echo remains whose level depends on how closely the filter may be made to approximate the echo path. In the foregoing, $g_i$ and $x_i$ are functions of time, and $x_i(t)=x(t+T-iT)$, $i=1, 2 \ldots N$, where T is the delay due to each segment of the delay line.

The outgoing signal, $y(t)$, will first be assumed to consist only of an echo of the transmitted signal. Further, it is assumed that the echo can be duplicated by the transverse filter. In that case, $$y(t)=\vec{H}\cdot\vec{H}$$

where $\vec{H}$ is the vector representing the echo "impulse response."

Then $$\frac{d}{dt}\vec{G}=-K(H(t)+\vec{G}\cdot\vec{X})\vec{X} \qquad (1)$$

where $$\vec{G}\cdot\vec{X}=\sum_{i=1}^{n} g_i x_i$$

Assuming that the echo path does not vary with time, $$\frac{dH}{dt}=0$$

Equation 1 can be rewritten as $$\frac{d}{dt}(\vec{G}+\vec{H})=-K((\vec{G}+\vec{H})\cdot\vec{X})\vec{X} \qquad (2)$$

Taking the dot product of both sides with $\vec{G}+\vec{H}$ one obtains $$\frac{d}{dt}|\vec{G}+\vec{H}|^2=-2K((\vec{G}+\vec{H})\cdot\vec{X})^2 \qquad (3)$$

Thus the magnitude of the vector $\vec{G}+\vec{H}$ is non-increasing and is strictly decreasing whenever there is an uncancelled zero. Eventually, therefore, the echo will be cancelled.

Further, integrating Equation 3 from O to $\tau$ gives $$|\vec{G}(O)+\vec{H}(O)|^2-|\vec{G}(\tau)+\vec{H}(\tau)|^2=2K\int_0^{\tau}((G+H)\cdot X)^2 dt \qquad (4)$$

The left hand side approaches $$|\vec{G}(O)+\vec{H}(O)|^2$$

in the limit as $\tau$ becomes large. Therefore the echo power, $$((\vec{G}+\vec{H})\cdot\vec{X})^2$$

monotonically goes to zero.

If $y(t)$ consists of noise, and a speech signal originates at the far end (double talking) besides the echo then we can write $$\frac{d}{dt}(\vec{G}+\vec{H})=-K((\vec{G}+\vec{H})\cdot\vec{X})\vec{X}-Kn(t)\vec{X} \qquad (5)$$

where $n(t)$ consists of all components of the received signal other than the echo. The analogous Equation 3 now becomes $$\frac{d}{dt}|(\vec{G}+\vec{H})|^2=-2K((\vec{G}+\vec{H})\cdot\vec{X})^2-2Kn(t)(\vec{G}+\vec{H})\cdot\vec{X} \qquad (6)$$

The second term on the right now tends to destroy the monotonic approach of $|\vec{G}+\vec{H}|$ to zero. However, since $n(t)$ and $$(\vec{G}+\vec{H})\cdot\vec{X}$$

are uncorrelated, this term will be randomly $+ve$ and $-ve$, giving a "monotonic" decrease of $$|\vec{G}+\vec{H}|^2$$

on an average.

The behavior of the system depends in large measure on the manner in which the error signal is processed in network 118. In the simplest case, network 118 may constitute a linear system whose essential function is to isolate the error loop network from the outgoing channel and deliver a wideband signal to multipliers 112. If this is done, gain control networks 110 must necessarily be wideband modulators capable of responding to a wideband control signal. Further, as the control loop tends to converge, the system may shunt about the optimum cancellation value.

In accordance with a preferred form of the invention, a nonlinear network is employed at 118 to process the error signal. A system which exhibits any one of a number of forms of nonlinearity may be used. Most afford some form of improvement. However, a judicious choice of the nonlinear characteristic considerably simplifies and improves the performance and implementation of the system. Preferably, an infinite clipper is used. Such a system has been found to yield excellent results. In essence, the applied error signal is severely clipped in order to produce a square-wave function indicative of positive error or negative error. As shown, for example, by J. C. R. Licklider and I. Pollack in the Journal of the Acoustical Society of America, vol. 20, 1948, pp. 42–51, infinite clipping produces a square wave of constant amplitude which denotes the polarity of the error. In any case, the processed error signal need only adjust the sign of the applied tap signal from delay line 100, i.e., in multipliers 112. The averaged signal may therefore be used simply to control a switch modulator to apply the tap signal to summing network 120. Gain control networks 110 can therefore be considerably simplified in construction.

The use of an infinite clipper in the error control network 118 has other advantages. Suppose that the system is near equilibrium and that echo has been reduced to a very low value. If there is now a sudden burst of noise, for example a spurt of double talking, then the rate at which a linear system moves away from equilibrium is proportional to the level of the noise. If an infinite clipper is used, however, the rate at which it moves away from equilibrium is essentially independent of noise level. Thus the system does not depart from equilibrium too rapidly upon the introduction of a large noise input.

Concomitantly, convergence or settling time is much less dependent on the input signal level. For example, if the signal level in the outgoing circuit drops in level by a factor of approximately ten, the time necessary for convergence with a linear error control network increases by a factor of about one hundred, whereas with a nonlinear clipper, convergence time is increased by a factor of only ten or so.

With the use of an infinite clipper, one may replace $E(t)$ in the relations developed above, by $$(E(t))=1$$

for $E(t)\geq 0$, $=-1$ for $E(t)\leq 0$. Following the same derivation as before, Equation 3 becomes $$\frac{d}{dt}|(\vec{G}+\vec{H})|^2=-2K|(\vec{G}+\vec{H})\cdot\vec{X}|$$

This yields a monotonic convergence at a rate proportional to $|X|$.

It is seen in Equations 3 and 7 that in the absence of extraneous signals, the convergence can be made as rapid as desired by making the gain factor K sufficiently large. However, extraneous signals will be present in practice due to simultaneous talking of both parties, additive noise in the circuits, and departure of the echo from a form which can be duplicated by the transversal filter. These extraneous signals are represented as $n(t)$ in Equation 6 and it is seen that these irreducible signals also are multiplied by K. This means that the coefficients $g_i$ of the transversal filter will never settle down to a constant but will have a residual ripple which increases with K and the level of $n(t)$. This residual ripple introduces its own noise in the circuit. Hence, there must be a compromise in the choice of K; K must be large enough to assure a reasonable convergence time but must not be so large as to introduce excessive ripple in the filter coefficients. In effect, the choice of K depends on the particular system with which the system is to be used. Since the settling time, and hence the choice of K, depends on the signal level, it may be desirable to maintain this level within tolerable limits, e.g., by use of a level control system.

The above-described arrangements are, of course, merely illustrative of the application of the principles of the invention. Thus, although the echo canceller apparatus of the invention has been shown in the figures and, for the most part, described for use in association with a hybrid junction terminal, it is to be understood that it may advantageously be used at any point in a two-way circuit. a first linear combination of selected tap signals may constitute complete communications networks, e.g., a number of terminal station links, some of which are interconnected by hybrid junctions. The cancellation apparatus may advantageously be used, therefore, at a ground station terminal which brings together a number of communications circuits for connection with a satellite communications circuit.

Similarly, the exact order in which the several signals available at the taps of the delay line system are combined may be altered to suit exact system needs. For example, a first linear combination of selected tap signals may be combined with a second linear combination of selected tap signals, and so on. The use of various linear combinations of the tap signals affords a great deal of design flexibility.

In the examples of the practice of the invention discussed above, it was assumed that the incoming and outgoing signals were of a standard level, i.e., that the signals never exceeded the signal handling capability of the circuit apparatus. Indeed, in most applications, this assumption is a valid one. However, if signal levels vary excessively, it may be desirable to employ some form of automatic gain control to restore incoming or outgoing signals to a usable level. Conventional cricuits are suitable.

In all events, it is apparent that numerous other arrangements may be devised by those skilled in the art without departing from the spirit and scope of the invention.

What is claimed is:

1. An echo canceller which comprises:
adjustable signal processing means connected in the first of two one-way transmission paths of a communication system,
means connected in the second of said two one-way paths for algebraically combining speech signals in said second path with speech signals supplied from said processing means, and
means responsive to said alegbraically combined speed signals for adjusting said signal processing means.

2. An echo canceller as defined in claim 1 wherein:
said adjustable signal processing means comprises a delay line tapped at Nyquist intervals,
means responsive to applied signals for individually adjusting the gains of signals developed at said taps, and means for algebraically combining said adjusted signals.

3. An echo canceller as defined in claim 1 wherein said means for adjusting said signal processing means includes means for developing a signal indicative of the algebraic sign of said combined speech signals.

4. An echo canceller as defined in claim 1 wherein said means for adjusting said signal processing means includes a nonlinear signal transmission network.

5. An echo canceller as defined in claim 1 wherein said means for adjusting said signal processing means includes an infinite clipper network.

6. An echo canceller as defined in claim 2 wherein said means for adjusting the gain of said signals developed at said taps includes a plurality of linear modulators.

7. An echo canceller as defined in claim 2 wherein said means for adjusting said signal processing means includes means for developing signals proportional, respectively, to the integral of the product of said algebraically combined speech signals and each of said signals developed at the taps of said delay line.

8. A closed loop echo cancellation system for use in a two-way communication signal circuit, which comprises:
adjustable means supplied with signals incoming in said circuit for developing an approximation to signals outgoing in said circuit which are closely correlated to said incoming signals,
means for algebraically combining said outgoing signals with said approximation signal to produce a differential signal, and
means responsive to said differential signal for adjusting said signal approximating means.

9. A closed loop echo cancellation system as defined in claim 8 wherein said adjustable means comprises:
a transversal filter system including a delay line tapped at Nyquist intervals,
means responsive to applied control signals for respectively adjusting the gain of signals developed at said taps in proportion to the average product of said tap signals and said differential signal, and
means for algebraically combining all of said adjusted signals.

10. A closed loop echo cancellation system as defined in claim 8 wherein said means for adjusting said signal approximating means comprises:
a network exhibiting a nonlinear characteristic supplied with said differential signals for developing error control signals, and
means for employing said error control signals for adjusting said means for developing said approximation to signals outgoing in said circuit.

11. In a two-way telephone circuit, an echo canceller in circuit connection with the incoming and outgoing speech signal paths of said telephone circuit which comprises:
means for continuously determining the correlation between speech signals in said incoming and said outgoing signal paths, signal processing means in said outgoing signal path, and means responsive to said determination for continuously adjusting said signal processing means.

12. In a two-way telephone circuit, an echo canceller in circuit connection with the incoming and outgoing signal paths of said telephone circuit which comprises:
means for continuously determining the correlation between speech signals in said incoming and said outgoing signal paths, signal processing means in said outgoing signal path, and means responsive to said determination for continuously adjusting said signal processing means to maintain minimum correlation between speech signals in said incoming and outgoing signal paths.

13. In a telephone circuit, an echo canceller in circuit connection with a two-wire to four-wire junction, which comprises:
processing means for developing a signal proportional to the correlation between signals incoming in one circuit of said four-wire system and signals outgoing in the other circuit of said four-wire system,
differential network means supplied with signals in said outgoing circuit of said four-wire system and with proportional signal for developing a signal continuously representative of the algebraic difference between said two signals, and
means responsive to said representative signal for continuously adjusting said signal processing means.

14. In a telephone circuit, an echo canceller as defined in claim 13 wherein said means for continuously adjusting said signal processing means includes a passive nonlinear network.

15. In a telephone circuit, an echo canceller as defined in claim 13 wherein said means for continuously adjusting said signal processing means includes an infinite clipper.

16. In association with a telephone circuit junction interconnecting a one-way incoming signal circuit and a one-way outgoing signal circuit with a single two-way signal circuit,
means for cancelling speech signals in said outgoing circuit which reach said outgoing circuit from said incoming circuit,
said means comprising,
a control means supplied with speech signals from said incoming circuit for adjusting the gain of said incoming circuit signals,
means for algebraically combining said gain adjusted input speech signals with speech signals in said outgoing circuit, and
means responsive to the algebraic difference for adjusting said control means to minimize said algebraic difference.

17. An adaptive echo canceller which comprises, in combination:
a tapped delay line,
means for supplying signals from a first of two interconnected communications circuits to said delay line,
means for individually controlling the gains of signals developed at the taps of said delay line,
means for algebraically combining all of said gain adjusted signals,
means for differentially combining said combined signal with communications signals in the second of said interconnected communications circuits to produce an error signal,
means for individually mixing each of said signals developed at the taps of said delay line with said error signal,
means for individually averaging the signals produced by said mixing means, and
means for utilizing said averaged signals individually for adjusting said gain controlling means.

18. An adaptive echo canceller as defined in claim 17 wherein said delay line is tapped to develop signals at Nyquist intervals.

19. An adaptive echo canceller as defined in claim 17 wherein said delay line is tapped to develop signals at approximately one-tenth millisecond intervals.

References Cited

UNITED STATES PATENTS 2,825,764 3/1958 Edwards et al. ---- 179—170.2

KATHLEEN H. CLAFFY, Primary Examiner

W. A. HELVESTINE, Assistant Examiner